Patented May 15, 1934

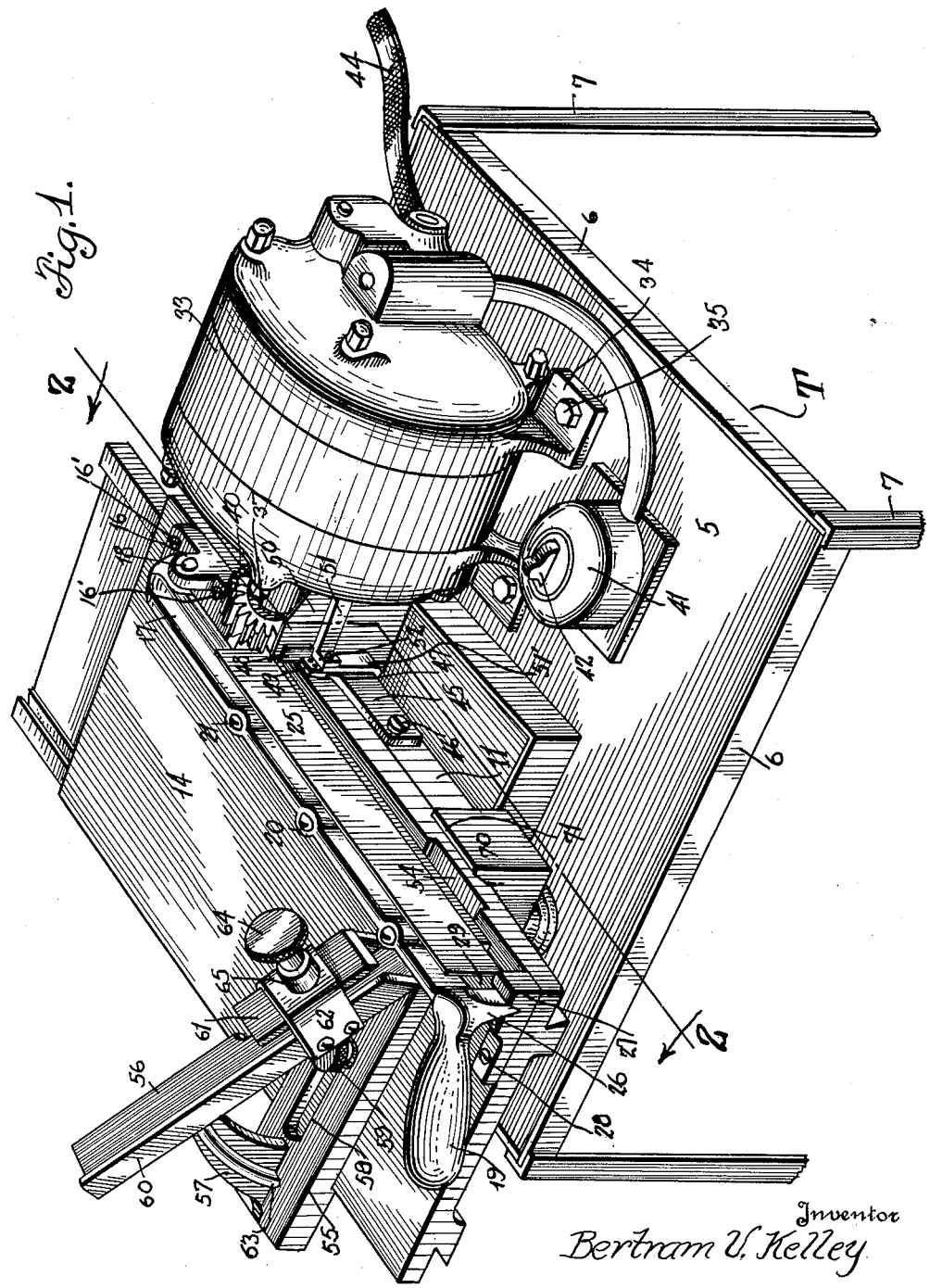

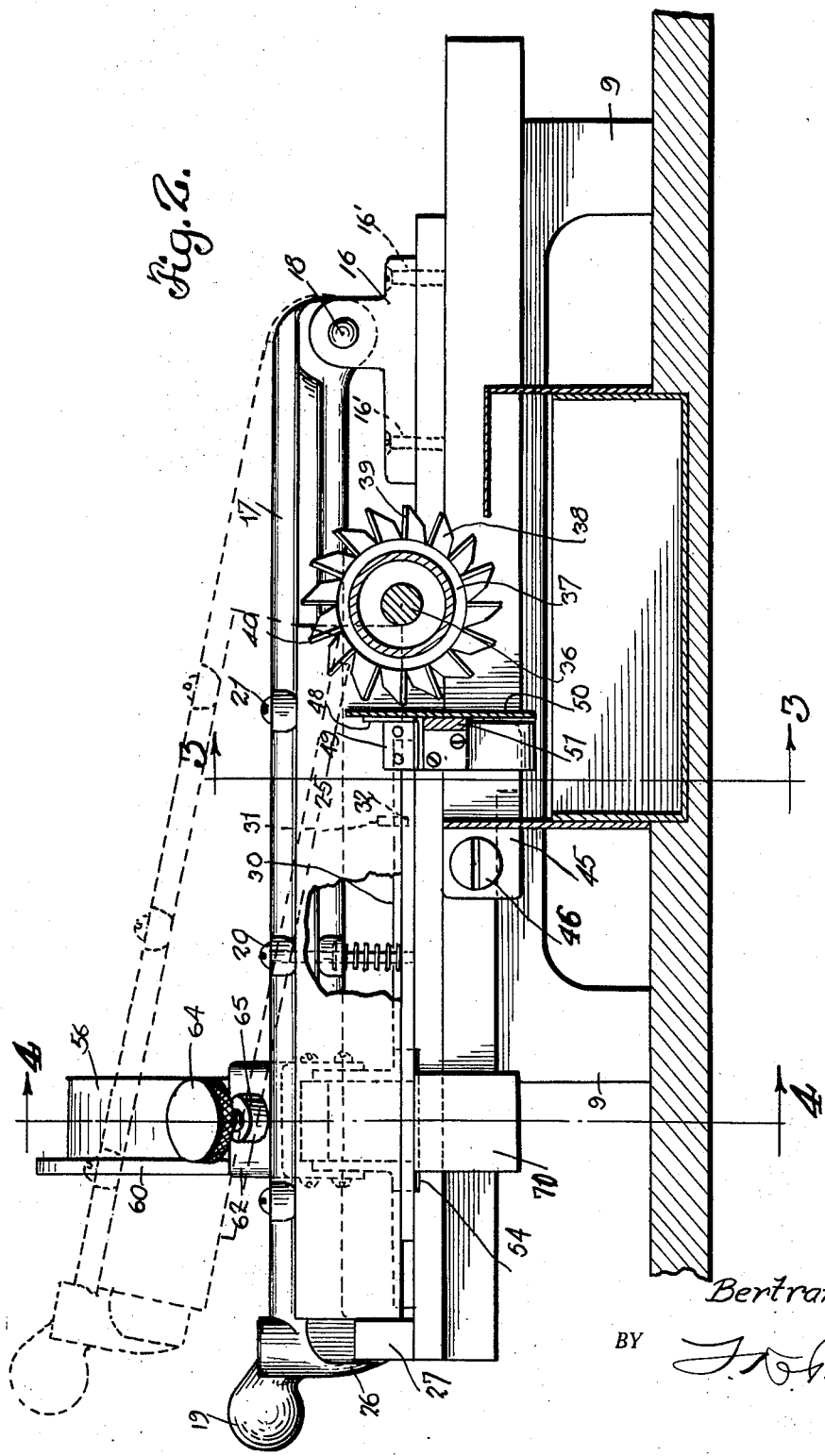

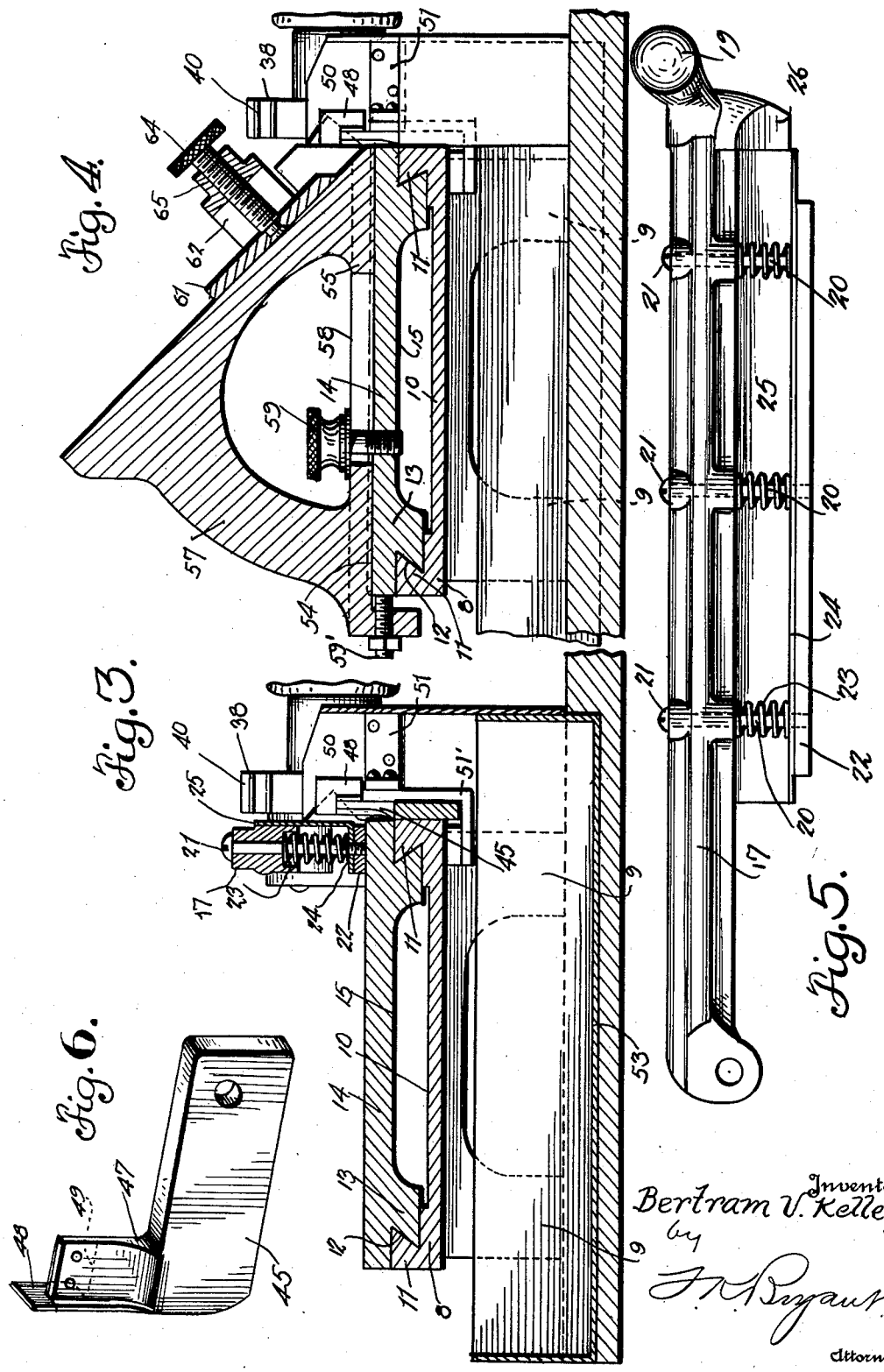

1,959,241

UNITED STATES PATENT OFFICE 1,959,241

ROTARY CUTTING OR TRIMMING MACHINE

Bertram V. Kelley, Topeka, Kans.

Application September 24, 1930, Serial No. 484,169

8 Claims. (Cl. 90—21)

This invention relates to improvements on rotary cutting and trimming machines for lowering the blank portion of slugs cast on linotype, intertype or other slug-casting type-setting machines, and the invention comprises a stationary table having mounted thereon an electric motor with a milling cutter on the armature shaft thereof having its radial face presented to the lateral edge of a sliding table adapted to hold the linotype, intertype or other casting machine slugs thereon by means of a suitable clamping lever having one of its ends pivotally secured to the sliding table and its opposite or free end adapted to be guided into position to extend longitudinal with one side edge of the movable sliding table, whereby the blank portion of the linotype, intertype or other type-slug may be lowered or milled at the blank portions thereof for preventing inking of the blank portions by the inking rollers of the printing press in order to avoid smearing, blotting or otherwise marring paper or cardboard in printing.

The invention further comprises an attachment for mitering borders, rules, leads or slugs in either linotype metal, type metal, stereotype metal, brass, or wood, of any thickness desired, which includes a mitering angle slidably mounted in a groove in the above mentioned movable work table arranged in such a manner as to present the linotype border or slug or other material to the milling cutter at a vertical angle.

The invention also comprises a slug-stop pivotally mounted on the lateral edge of the sliding table adapted to engage the type on the printing face of the linotype slug in order to prevent cutting into and damaging the printing face.

Heretofore, it has been the common practice to lower the blank portions of printing slugs by holding the same in the hand and presenting the blank portion to a rotary saw or cutting element. Such practice is objectionable, due to the fact that oftentimes the printing face is damaged, due to misjudgment and excessive pressure on the printing slugs, thereby making the operation dangerous due to the fact that the operator's hands may slip and be cut by the rotary cutting element or saw. It has also been proposed to place a series or gang of printing slugs in a tray or holder and clamp the same in place by a hand screw or thumb screw with the printing faces up, whereby the tray may be presented to a rotary saw or cutting element for removing the desired portion of the blank part of the type slug by moving the entire assembly, including the tray and the series of slugs clamped therein, into the path of the saw. This practice is also objectionable, due to the time consumed in placing the slugs or type bars in the tray and the manner of clamping by hand screw or thumb screw, and after the same have been cut, releasing the clamp and placing the bars or type slugs back in their proper place within the printing frame. Due to the fact that the majority of type slugs to be cut in the above described manner are scattered throughout the type slugs in the manner and order in which they are produced by the linotype or other slug-casting type-setting machine, it occasionally occurs that the type slugs are misplaced when being transferred from the cutting machine tray to the printing frame, which results in an error in the printed copy.

The above objections and disadvantages are overcome by providing a machine of the above mentioned character in which the type slug is quickly clamped upon a movable table having suitable gauge bars and clamp thereon for holding the slug in the desired position, and means for stopping the movement of the type slug relative to the cutting element, which is entirely automatic, whereby the operator's hands cannot come in contact with the rotary cutting element as they do not touch the type slug or bar during the cutting operation. By cutting each individual slug bar as the occasion occurs, and placing them in order, mistakes or errors are prevented.

It is the purpose of this invention to provide a type slug milling machine, having in combination therewith a mitering device which is presented to the cutting element in such a manner as to prevent inaccurate cutting of the ends by the cutting element when the line bar or border bar is being beveled for the purpose of joining the beveled ends to form a border for the printing element. Heretofore, it has been the usual practice to provide a mitering device whereby the border bars may be presented angularly to the cutting element and in a horizontal plane with the surface of the operating table or sliding platform. This practice is objectionable due to the fact that the cutting element, which usually includes a cutting saw and trimming device, due to the fact that the rotary saw and trimming device breaks the corners off of the beveled portion and does not cut the beveled portion in a true fashion, whereby the joint of a framing or border bar may fit closely in order to prevent a space or gap at the point where the two beveled or mitered corners join in the printed line. By presenting the mitering device to the rotary cutting element in a vertical fashion, the beveled edge of the bordering slug is cut in a true fashion and it will be found in practice that the ends and edges and sharp corners have not been damaged by the cutting element, as is the result of the above mentioned practice heretofore in common use.

A still further object of this invention is to provide a device for lowering the blank portion of type slugs, which includes a rotary cutting element having peripheral cutting edges as well as radial face cutting edges whereby the type slugs may be cut by the peripheral cutting edges and the cut edge may be further trimmed by the cutting edges on the radial face of the rotary cutting element.

Other objects of the invention will become apparent during the course of the following description, forming a part of this specification, and in which:

Figure 1 is a perspective view of the machine embodying this invention, illustrating the arrangement of the motor and cutting element relative to the work supporting table and the movable or sliding slug support;

Figure 2 is a longitudinal cross-sectional view taken on line 2—2 of Figure 1, looking in the direction of the arrows for illustrating the arrangement of the rotary cutting element and the manner in which the same is presented to one lateral edge of the movable or sliding work support;

Figure 3 is a transverse cross-sectional view taken on line 3—3 of Figure 2, illustrating in detail the clamping lever carried by the movable sliding table, and also illustrating the stop mechanism for preventing forward movement of the type slug after the desired portion thereof has been removed by the rotary cutting element;

Figure 4 is a transverse cross-sectional view taken on line 4—4 of Figure 2, illustrating in detail the mitering device, which is removably supported by the sliding work table, whereby the same may be moved out of the path of the pivoted type slug clamping lever;

Figure 5 is a longitudinal elevation of the type slug clamping handle and lever illustrating the same in detail and showing the resilient manner in which the slug clamping bar is carried thereby; and Figure 6 is a sectional view, illustrating in detail the type slug stop pivotally secured to the stationary work table support.

In the drawings, wherein for the purpose of illustration and wherein like reference characters will be employed to designate like parts throughout the same, the reference character T will generally be employed to designate a table or work stand including a removable square top 5 which rests upon a stand having lateral edge flanges 6 at the joining corners of which is secured vertical standards or supporting legs 7. It is to be understood that any form of table and stand may be employed, but it has been found in practice that a light metallic table and work stand is better adapted for the purpose and is more economical to produce.

Secured to the table top 5 at one side thereof is a work table guide 8 having feet 9 formed integral therewith at the corners, whereby screws or the like may be passed through the table top 5 and may be threaded into openings in the bottom wall of the legs 9. The upper face of the stationary support 8 is provided with a longitudinal cut-away portion 10 in order to form longitudinal edge strips 11 which are adapted to be beveled on their inner edges as at 12 to form grooves for receiving longitudinal guide ribs 13 formed integral with the movable work supporting table 14. The movable work table 14 is also cut away on its underside as at 15 in order to reduce the weight of the sliding work table 14.

The sliding work table 14 may be formed rectangular and is provided at one end with a lug 16 held in place by screws 16' to which is pivotally attached a type slug clamping lever 17 as by means of a pin or bolt 18. Formed on the opposite end of the clamping lever 17 is a handle 19 which extends angularly from the clamping lever 17 in order that the same may be grasped by the operator's left hand, while the slugs are placed in position with the right hand. Enlarged portions 20 are formed throughout the length of the operating lever 17 for receiving machine screws 21 which pass therethrough and have their free ends threaded into an elongated clamping bar 22 whereby the clamping bar 22 may be loosely mounted on the operating lever 17. Interposed between the operating lever 17 and the slug clamping bar 22 is a coil spring 23 which has one of its ends bearing against the underside of the operating lever 17 and its opposite end bearing against the base portion 24 of the triangular guard member 25 which extends vertically therefrom and parallel with the operating lever 17. The base portion 24 of the longitudinal guard member 25 is provided with openings through which also passes the machine screws 21 whereby the guard member will be moved with the operating handle or lever 17 during its upward and downward movement.

Formed integral with the free or swinging end of the operating lever 17 is a wedge-shaped lug 26 which is adapted to be received in a corresponding slotted guide block 27 secured to one corner edge of the slidable operating table 14 by means of a screw or bolt 28 whereby downward movement of the operating lever 17 will cause the lug 26 to be guided into the corresponding opening in the guide block 27 whereby alignment of the operating lever will be effected with the longitudinal side edge of the movable or slidable work table 14.

It will be noted that when the operating handle 19 of the clamping lever 17 is moved downwardly, the slug clamping bar 22 is resiliently pressed into engagement with the upper surface of the slidable work supporting table 14 at one edge thereof and, if desired, the underside or contacting face of the slug clamping bar 22 may be roughened or provided with teeth or projections for engaging the side wall of the linotype slug, or other casting machine slug, being operated upon, in order to firmly hold the same in position on one lateral edge or side of the upper wall of the work table 14. The linotype or other type-setting machine slug may be further held in place by presenting the rear edge or inoperative edge against a guide plate 30 which is secured to the upper surface of the slidable table 14, and by placing the end of the linotype or other casting machine slug against the guide block 27. The type slug guide 30 is removably secured to the upper face or top of the slidable supporting table 14 and is held in place by pins 31 mounted therein entering openings 32 formed in the top wall of the sliding work support table 14.

Rigidly mounted upon the table top 5 is an electric motor 33, which has its feet or base portion 34 secured to the table top by machine screws or bolts 35 whereby the electric motor 33 is held stationary relative to the table top 5 in such a manner that the armature shaft 36 is presented at right angles to the direction of movement of the sliding work table 14. Rigidly secured to the armature shaft 36 is a rotary cutting element 37 having radial cutting teeth 38 provided with cutting edges 39 on the radial faces thereof and cutting edges 40 on the peripheral faces thereof. The rotary cutting element 37 is presented to the sliding work table 14 adjacent the lateral edge thereof in order that work or metal held between the top face of the sliding work table 14 and the clamping bar 22 may be moved into the path of the cutter for removing portions of metal therefrom. The electric motor 33 may be controlled by an electric switch 41 suitably mounted upon the base 5 and having an operating button lever 42 whereby movement of the lever 42 in one direction will close the circuit through the motor 33 and through the power supply line 44 to cause the rotary cutting element 38 to be rotated in the direction in which the cutting teeth 38 extend.

Pivotally secured to the longitudinal edge 11 of the stationary supporting table 8 is a slug stop mechanism 45 which is secured to the longitudinal edge 11 by means of a screw or pivot pin 46. The slug stop bar 45 is milled in order to form an angle extension 47 on the end thereof to secure lip or projection 48 which extends at a right angle toward the sliding table 14 to a distance just clearing the blank portion of the slug to be cut away in order that this blank portion may be moved forward to engage the cutter 37 and thus cut away the blank portion of the slug up to the type face of the slug. When the type face of the slug comes in contact with the projecting lip 48 on the end of the slug stop bar 45 this projecting lip 48 comes in contact with the type face portion of the slug and stops the forward movement of the slug and sliding table 14, thus stopping the slug and preventing the cutting or injuring in any way of the type face of the slug. The slug stop bar 45 is further supported by a bracket 51' which allows the slug stop bar 45 to come into correct position relative to the cutter 37. This bracket 51' is attached to the under side of the stationary table 8 by means of screws (not shown). A bracket 51 is provided having an angle portion 52 which is connected to the supporting bar 51' by means of a screw, and attached to this bracket 51 is a shield 50.

A tray 53 may be mounted under the rotary cutting wheel or milling wheel 37 in order to collect the chips or cuttings from the type-setting machine slugs.

A slot 54 is cut transversely in the upper face of the sliding operating table 14 for receiving the base portion of a mitering device 55 which includes a workholder 56 formed integral with the base and having its rear or vertical end further supported by a casting or bracket 57. A slot 58 extends longitudinally in the base 55 and is adapted to receive a thumb screw 59 which has its opposite end threaded into an opening within the transverse groove 54. An adjusting screw 59' is provided at the end of the base 55 for moving the mitering device to an adjusted position.

The work support 56 is provided with a lateral guiding edge 60 whereby the border or material to be mitered may be guided in the work support 56 and may be positioned under a clamping plate 61 which is supported by a U-shaped bracket 62 secured to the lateral edge 60 of the work holder 56 by means of machine screws 63. The clamping plate 61 is rotatably mounted on the end of a thumb screw 64 adapted to be threaded through a collar 65 formed integral with the U-shaped supporting member 62 whereby turning movement of the thumb screw 64 will cause the clamping plate 61 to be moved up and down relative to the work supporting member 56. It is to be noted that the mitering device above described is mounted upon the sliding table 14 in order that the work may be presented to the lateral edges of the sliding table 14 in a vertical fashion whereby when the work is moved in the direction of the cutting element 37, the cutting teeth 39 and 40 will cut only a small portion of the material to be mitered upon each revolution of the cutting element, which is an advantage over prior art and common practice wherein the mitering device is arranged on the work table horizontally which causes the material to be cut more suddenly than by practicing this invention.

Rigidly secured to the stationary table 8 is a lug 70 having a beveled upper surface 71 adapted to be engaged by the material to be mitered when the same is placed in the work holder 56 in order to align the material in correct position before the same is operated upon by the rotary cutting element 37, whereby the material to be mitered will be beveled at the end thereof without making the material shorter and without chipping or marring the face of printing surface, which occurs when the material to be mitered is presented at an angle horizontally instead of at an angle vertically to the rotary cutting element.

For a consideration of the operation of the invention, attention is directed to Figure 1 wherein is shown a perspective view of the assembled machine, and in use, the operator desiring to lower the blank portion or a linotype, intertype or other type-setting machine cast slugs, grasps the handle 19 of the clamping lever 17 and raises the same above the table or platform 14 whereby the slugs may be placed on the table adjacent one edge and may be guided to the edge by the guide plates 29 and 30. The handle is then moved downwardly to bring the clamping lever 17 and the resilient lug clamping bar 22 into engagement with the slug, whereby the motor 33 may be started by operation of the switch lever 42 to cause the rotary cutting element or milling tool 37 to be rotated in the direction of extension of the cutting teeth. The operator then pushes the handle 19 toward the cutting element, which causes the sliding table 14 and linotype slug or other type-casting machine slug to be moved into the path of the rotary cutter 37 for removing blank portions at the ends of the printing face. The stop finger 45 is presented in the path of the type face on the printing face of the type-casting machine slug whereby as soon as the type face engages the lip 48 the movement of the sliding table 14 and type slug is stopped, thereby preventing forward movement of the sliding table 14 and slug in the direction of the rotary cutting element 37. In this manner, the operator may pick out or select at random the type-slugs to be cut, from the type slugs in the order in which they come from the type-casting machine and place them on the table abutting the block 27 and the guide plates 29 and 30 and may run the same into the path of the rotary cutting element 37 and then raise the handle 19 and reverse the type-setting slug in order to cut the opposite end thereof.

When it is desired to miter or bevel the ends of printers' rules or bordering frames or other material, the clamping lever 17 is raised to a vertical position and the mitering device 55 is then moved over to right hand edge of sliding table 14 in the groove 54 until the adjusting screw 59' comes in contact with left edge of sliding table 14. Then the screw 59 is tightened, holding the mitering device 55 rigidly in groove 54 in proper position. Secondly the sliding table 14 is pulled backward or toward the operator until the groove 54 on the sliding table 14 aligns with the bevel guard 70. The rule or border or other material is then inserted in the mitering device 55, including the angular support 56, and so placed that the end of such rule or border or other material is presented to lie flush or accurately abut the surface of 75 of the lug 70. The thumb screw 64 is then turned causing the plate 61 to firmly engage the material to be mitered. The sliding table 14 is then moved in the direction of the rotary cutter 37, whereby the rotary cutter 37 accurately bevels one end of the bordering frame or rule.

It often happens that it is necessary to alternately cut the blank portions of type-casting machine slugs and bordering frames and this is accomplished by alternately moving into and out of operative position the mitering device 55 and the operating lever 17. When it is desired to use the mitering device 55, the stop finger 45 is moved on its pivot pin 46 to swing away from the rotary cutter, whereby the stop lug 48 will be removed out of the path of the bordering frame or rule to be beveled.

As will be seen, the clamped slug is so positioned on the table that the advance of the latter advances the slug in the longitudinal plane of the latter, the sides of the slug being parallel with the table top. In this position the type face zone and the blank zone project in front of the table and clamping member, the position being such that the planes of the type face and of the blank face both extend normal to the axis of the cutting element, the plane of the type face being spaced the greater distance from the front of the clamping member, but both planes are located that the plane of the blank face lies within the width of the peripheral cutting teeth of the cutting element, but does not reach to the inner edge of the stop member, such inner edge extending to a point between the two planes.

As a result, when the table and its positioned slug is advanced to present the most remote portion of the blank zone to the cutting teeth, the peripheral teeth of the latter will cut in a direction transverse of the slug, the width of the cut being dependent on the projection of the blank face from the front of the clamping member. Since the width of the cut represents the depth of the material to be removed, it will be readily understood that the width of the cut will be small, which, together with the fact that the cut extends only across the width of the slug, provides an arrangement in which the cutting element need not be of extended width, and can be operated at high speed, if desired, the amount of metal removed by a tooth being relatively small. The advantage of this lies in the fact that the table is moved manually, so that the pressure is provided by the operator; with the small increment that is removed by the cut of a tooth, the vibration condition is brought very low, and greater ease in the advance or feed of the slug is provided.

The table continues to advance until the type face zone reaches and contacts the stop, whereupon further advance of the table is ended, and ending the active cutting action. During such advance, the cutting side edges of the teeth become active to smooth the new blank face, so that the latter, when the advance has ended, presents the face as perfectly flat, and completed with the single advance of the slug. The action is made possible, of course, by the fact that the width of the cut is small and the distance to be traversed by the tooth through the slug is limited to that of the width of the slug. The table can therefore be advanced fairly rapid without materially affecting the arm of the operator by vibration effects, thus permitting the slug to be completed rapidly, and without danger to the type face, since the latter is held from reaching the cutting path by the stop, regardless of the relative length the type zone may have.

Owing to the fact that the greater portion of linotype or other type-casting machine slugs have the type face extending their entire length, therefore requiring no cutting away of blank portions, and that those which do require cutting down of the blank portion are largely scattered throughout the slugs as they come from the linotype or other type-setting machines, it will be readily observed that by selecting at random the linotype or other type-casting machine slugs from the slugs in the order in which they come from the type-setting or casting machine and placing them one at a time under the clamping bar 22 attached to clamping lever 17 and cutting each blank portion to a point adjacent to the printing surface and returning them immediately to their proper place, that more time is saved than by other methods and processes whereby the blank portions or parts thereof are removed by hand or placed in a tray in order to operate upon a gang or series of the slugs at once, which necessitates the time for placing the slugs or linotype printing members back into their original position as they were ejected from the type casting machine.

It is to be understood, that various changes in the shape, size and arrangement of parts may be resorted to without departing from the spirit of the invention or the scope of the sub-joined claims and that the form of invention herewith shown and described is to be taken as a preferred example of the same in accordance with the invention.

I claim:—

1. A combined mitering and milling machine of the character described, adapted to operate upon linotype or other type-casting machine slugs, and printer's borders and rules, including a movable table, means on the table for positioning type slugs, a rotary cutting element positioned relative to a lateral edge of the movable table for removing portions of the type slugs and means independent of the table for stopping the movement of the slidable supporting table to prevent removal of the printing characters on the face of the type slug, said means being rendered active by a predetermined printing character.

2. A combined milling or mitering machine of the character described, adapted to operate upon linotype or other type-casting machine slugs comprising a movable table, clamping means carried by the table, whereby a type slug may be held in a desired position, a rotary cutting element having peripheral cutting teeth positioned relative to a lateral edge of the movable table and in the path of the type slug whereby portions of the type slug may be removed upon movement of the table along the path of the cutter, means independent of the table for stopping the movable table at a desired position for preventing removing the type face of the type slug, said means extending into the path of travel of the slug type face and being rendered active by contact with a predetermined portion of such face, and a mitering device presented at a vertical angle carried by the movable table, adapted to be moved into the path of the rotary cutting element for removal therefrom as desired.

3. A combined mitering and milling machine of the character described, adapted to operate upon linotype or other type-casting machine slugs comprising a movable table, means associated with the table for clamping type slugs thereon whereby the printing face of the type slug may project beyond the lateral edge of the table, a rotary cutting element having peripheral cutting edges positioned relative to a lateral edge of the movable table, whereby movement of the table and type slug into the path of the cutting element will remove portions of the type slug, a pivoted stop finger independent of the table and associated near the rotary cutting element, said stop finger being located relative to the path of travel of the slug printing face to cause engagement between a predetermined portion of such face and the finger to stop advancing movement of the table and limit the cutting action of the cutting element on the slug.

4. As a means for removing and lowering the blank portions and parts thereof on linotype or other type-casting machine slugs, mechanism including a slidable table movable in a path normal to the axis of a rotary cutting element, a clamping member carried by the slidable table adapted to clamp a printing member thereon and means independent of the table and made operable by contact with the printing face of the clamped slug during advance of the table for stopping movement of the sliding table in the direction of the rotary cutting element, whereby the length of sliding movement of the table is determined by the position of the slug on the table.

5. As a means for removing parts of metal from the blank portions of linotype, intertype or other type-casting machine slugs, a mechanism comprising a slidable table adapted to move toward and away from and across the path of a cutting element, means carried by the sliding table for clamping a type-casting machine slug thereon whereby the printing face will be presented to the lateral edge of the sliding table and in the path of the rotary cutting element, and means independent of the table and operable on the type casting machine slug, intertype slug or linotype slug, for preventing forward movement of the sliding table and the slug in the direction of the rotary cutting element whereby the printing face of the slug will not be removed.

6. In the preparation of machine-cast slugs for printing service, wherein the cast slug includes a type-face zone and a blank zone, and wherein the blank zone is to be lowered by trimming to complete the preparation, a rotating cutting element having cutting edges, a table movable relative to the cutting element for supporting the slug to be trimmed, means carried by the table for clamping a slug thereon with the sides of the slug extending parallel with the supporting face of the table and with the type face zone of the slug and the blank zone projecting forward of the clamping means and extending in parallel planes normal to the cutting axis and the plane of the blank zone intersecting the cutting path, and a stop element positioned in advance of the cutting element and in the path of the type face zone but free from the path of the blank zone, whereby the positioned slug will be advanced with the table to present the blank zone to the cutting element and with the length of table advance limited by contact of the end of the type-face zone with the stop element.

7. The structure of claim 6 characterized in that the slug is positioned on the table in such manner as to present initially for cutting the portion of the blank zone most remote from the type-face zone during advance of the table.

8. In the preparation of machine cast slugs for printing service, wherein type-face slugs are trimmed to lower the blank zone of the slug, and wherein slugs for borders or rules are trimmed for border service by mitering, a combined machine adapted to perform either service, said machine comprising a rotating cutting element having cutting edges, a table movable relative to the cutting element for supporting the slug to be trimmed, a clamping means for the type-face slug carried by the table and adapted to clamp the slug to cause advance of the latter in the longitudinal plane of the slug to present the blank zone to the cutting element with the cutting path extending transversely of the slug, a support for the slug to be mitered, said support being carried by the table and having its supporting face arranged to support the slug inclined to table top and with the length of the slug extending transverse to the direction of advance of the table, whereby the advance of the table will present the end of the slug for miter trimming, and a stop element positioned in advance of the cutting element and extending in the path of the type-face zone of the type-face slug but being non-active with the blank zone of such slug, said support having clamping means for the slug supported thereby, said table clamping means, the slug support, and the stop element each being movable to and from an inactive position, whereby the slug support may be retained inactive during trimming of the type-face slug and the table clamping means and stop element may be retained inactive during trimming of the slug being mitered, said stop element when active serving to limit advance of the table a distance sufficient to permit entry of the type-face zone within the cutting path.

BERTRAM V. KELLEY.